April 10, 1934.   G. E. MIRFIELD ET AL   1,954,679
RESISTANCE WELDING MACHINE
Filed June 22, 1932   4 Sheets-Sheet 1

WITNESS
F. J. Hartman

INVENTORS
George E. Mirfield,
Cyril Firth.
BY
ATTORNEY

April 10, 1934.   G. E. MIRFIELD ET AL   1,954,679
RESISTANCE WELDING MACHINE
Filed June 22, 1932   4 Sheets-Sheet 2

WITNESS
F. J. Hartman.

INVENTORS
George E. Mirfield,
Cyril Firth.
BY
ATTORNEY

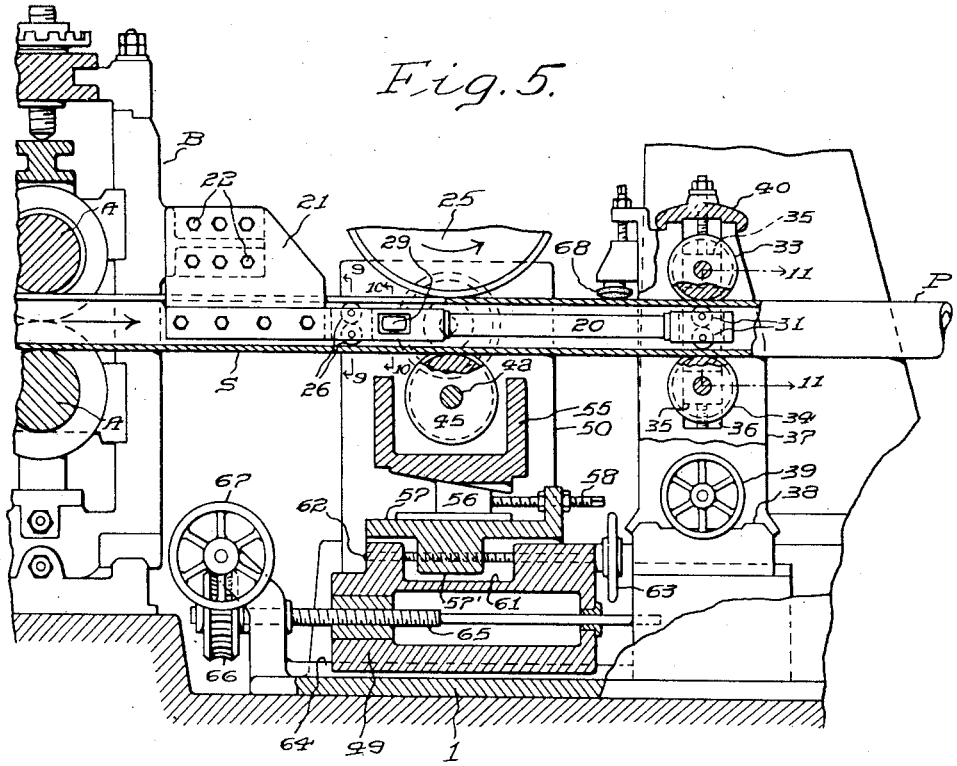

April 10, 1934.  G. E. MIRFIELD ET AL  1,954,679
RESISTANCE WELDING MACHINE
Filed June 22, 1932  4 Sheets-Sheet 4
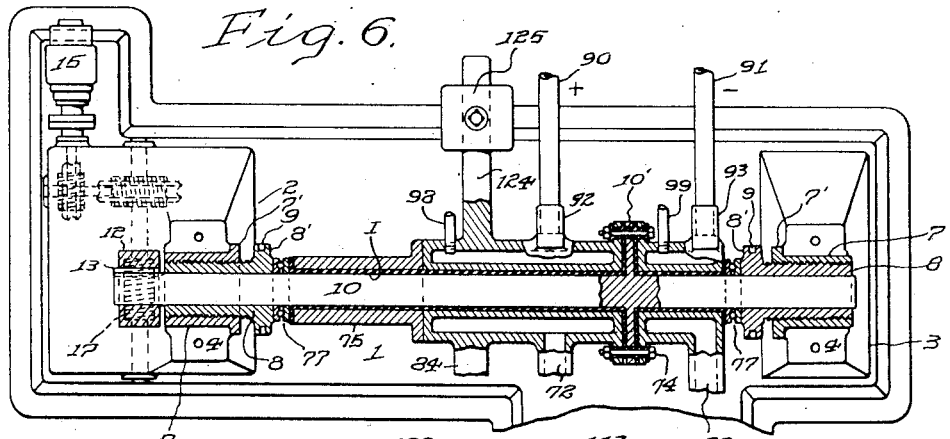
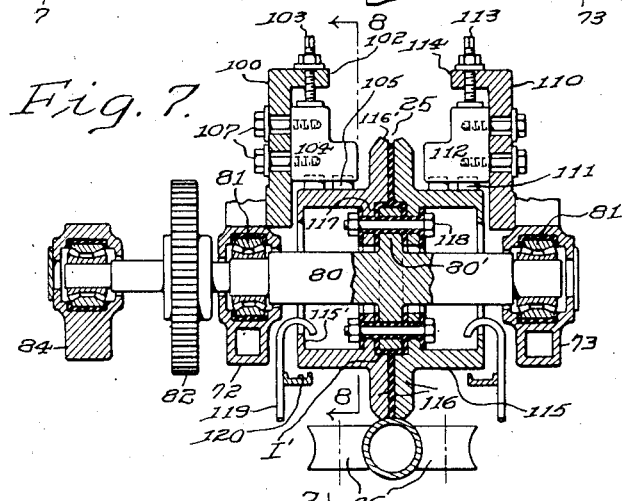
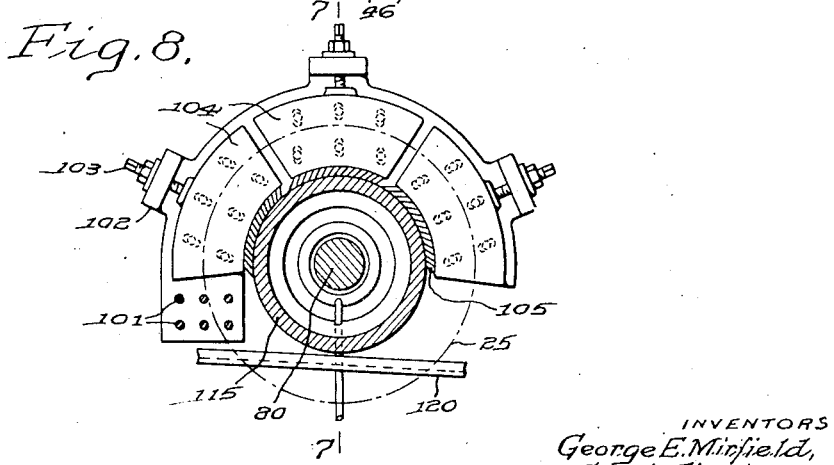

Patented Apr. 10, 1934

1,954,679

UNITED STATES PATENT OFFICE 1,954,679

RESISTANCE WELDING MACHINE

George E. Mirfield and Cyril Firth, Youngstown, Ohio, assignors to The Youngstown Sheet and Tube Company, Youngstown, Ohio, a corporation of Ohio Application June 22, 1932, Serial No. 618,614

25 Claims. (Cl. 219—6)

The principal object of our invention is to provide a resistance welding machine for welding together the longitudinal edges of a strip of skelp or the like which has been previously formed up to substantially cylindrical cross section to thereby form a pipe or tube, which comprises novel features of design and construction which tend to facilitate its easy, rapid and economical operation.

A further object of the invention is the provision of a pipe or tube resistance welding machine which may be readily arranged for the use of direct or alternating current as may be desired and which is adapted for welding different sizes of pipes and tubes within a considerable range.

A further object of the invention is the provision of such welding machine which, in its preferred embodiments, comprises a revolving electrode adapted for contact with the work as it passes through the machine together with novel means for supporting this electrode and conducting the welding current to and from the work, and which is so arranged that the electrode and associated parts may be readily removed and replaced if required.

The invention further includes the provision of very simple means for driving the electrode and for effecting its adjustment relatively to the work as required in accordance with variations in size of the latter; the provision of novel means for cooling the electrode and other current conducting parts; and the provision of a counterbalance for the electrode and associated parts to compensate for any looseness or wear in the electrode adjusting mechanism, and to facilitate the maintenance of a desired and constant pressure of the electrode upon the work, as well as other novel features, objects, advantages and improvements in design, construction and arrangement hereinafter more particularly mentioned or which will be apparent to those skilled in the art from the following description of certain embodiments of our invention as illustrated in the accompanying drawings.

Figure 1:
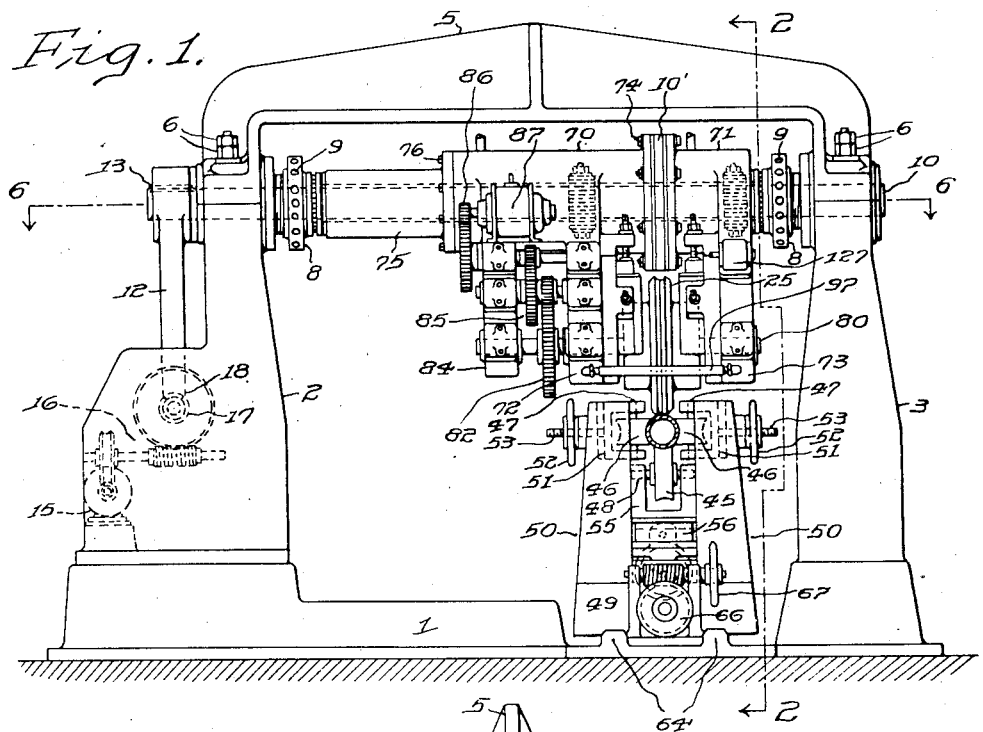
Figure 2:
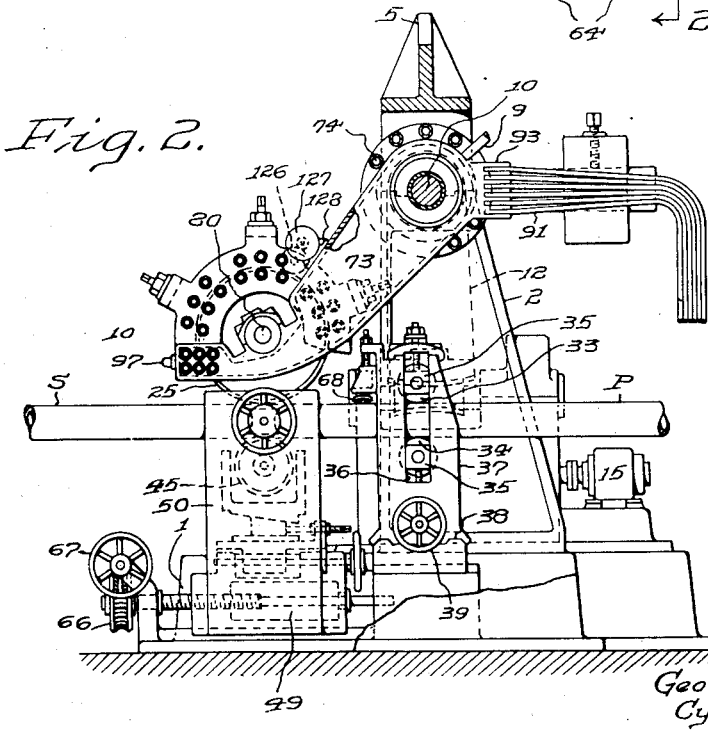
Figure 3:
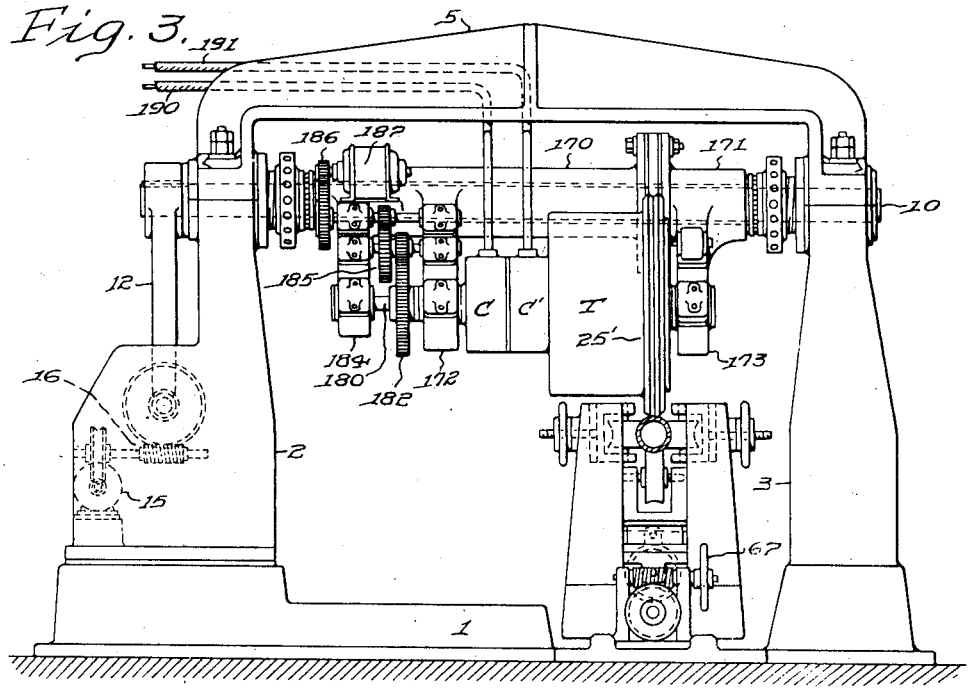
Figure 4:
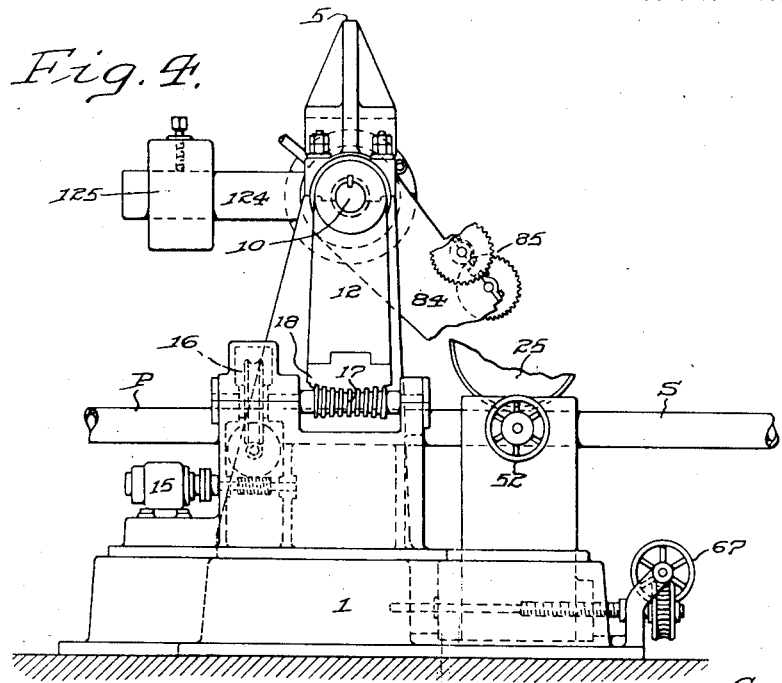

In the said drawings, Fig. 1 is a front elevation of the machine arranged for direct current operation, and Fig. 2 is a section thereof on the line 2—2 in Fig. 1 with certain parts broken away into fragmentary sections to better show internal construction. Fig. 3 is a view generally similar to Fig. 1 showing the machine arranged for alternating current operation; Fig. 4 is a fragmentary left hand end view of the machine as shown in either Figs. 1 or 3; Fig. 5, which is on a somewhat larger scale than the preceding figures, is a fragmentary longitudinal central section with certain parts shown in elevation particularly designed to illustrate the arrangement of the pressure roll adjusting means, mandrel and associated parts, a portion of one of the forming roll stands on the front or entering side of the welding machine being also fragmentarily shown. Fig. 6 is a fragmentary horizontal section through the machine on the plane 6—6 in Fig. 1; Fig. 7 is an enlarged fragmentary vertical section through the revolving electrode and associated parts as shown in Fig. 1, and Fig. 8 is a vertical section on the line 8—8 thereof. Figs. 9, 10 and 11 are respectively materially enlarged fragmentary sectional views respectively on the planes 9—9, 10—10, and 11—11 of Fig. 5, particularly designed to illustrate the arrangement of the rollers carried by the mandrel and of the seam pressing rolls which operate on the exterior of the pipe after the seam has been welded. Throughout the drawings, the same characters of reference are used to designate corresponding parts in the several figures.

As hitherto stated, the machine of our invention may be adapted for use with direct or alternating current as desired, the change from one arrangement to the other being readily accomplished in a comparatively short period of time as will hereinafter more fully appear. For convenience of description, we shall therefore first refer to those elements of the machine which are common to both arrangements and thus employed irrespective of whether the machine is set up for direct or alternating current, and shall then refer to the parts which are operatively associated therewith in accordance with which type of current is to be used.

It will of course be understood that the skelp or other material which is to be welded into a pipe or tube through the medium of the machine is first formed-up to substantially circular cross section by suitable forming mechanism which forms no part of the present invention and which lies to the left of the last pair of forming or feed rolls A—A mounted in a suitable roll stand B as indicated in Fig. 5. From these rolls, the formed-up skelp S is continuously fed through the welding machine in the direction of the arrow and ultimately emerges therefrom as a welded pipe P preparatory to subjection to the usual straightening or like operations which also form no part of the present invention which is concerned solely with the welding machine per se. Thus, prior to the actual welding of the seam which is accomplished as the skelp passes beneath the revolving electrode comprised in the welding machine, the longitudinal edges e—e of the skelp S are more or less slightly separated preparatory to their being brought into contact or substantial contact just before the welding point, that is, the point or zone in which the electrode contacts the work, is reached to thereby facilitate the uniting of the edges in accordance with the well known principles of resistance welding, following which the pipe in the vicinity of the seam is cleaned of any adhering particles of metal and the seam thereafter subjected to radial pressure just before the pipe leaves the machine.

The welding machine itself comprises a base 1 extending generally transversely of the path of movement of the pipe from which on opposite sides of said path rise pedestals 2, 3 respectively provided at their upper ends with seats 4 for the reception of the downwardly turned ends of a yoke 5 which extends between the pedestals and is secured in position thereon by nuts 6 threaded onto stud bolts seated therein. The yoke thus serves to tie the pedestals firmly together and forms therewith a rigid supporting structure for the parts now to be described.

The upper end of each pedestal and the adjacent end of the yoke are bored to receive a bushing 7 having a flange 7' at its inner end bearing against the adjacent face of its supporting parts; this bushing is internally threaded and receives a correspondingly externally threaded bushing nut 8 having a flange 8' at its inner end desirably provided with spanner holes 9. These bushing nuts form bearings for the opposite ends of a horizontally disposed shaft 10 as best shown in Fig. 6, from which the electrode and other parts are supported as hereinafter described. One end of the shaft, for example, the left hand end as shown, is extended entirely through the adjacent bushing nut and is provided with a downwardly depending crank 12 secured to the shaft by a key 13 or in any other convenient way so that as the crank is moved to and fro, corresponding rotational movement is imparted to the shaft. Suitable means are provided for effecting this movement of the crank such, for example, as a driving motor 15 mounted on an extension of the base of the machine and arranged through a suitable gear reduction drive generally designated as 16 housed in the base of the pedestal 2, to ultimately drive a worm 17 meshing with a worm gear segment 18 on the lower end of the crank 12; thus, by running the motor in one direction or the other, the crank may be swung to and fro through a limited arc so as to correspondingly turn the shaft 10 in its bearings for a purpose which will be hereafter more fully apparent.

The shaft 10 serves as a support for the rotatable electrode and associated parts which are carried on the shaft between the pedestals 2, 3, and as these parts differ somewhat for direct and alternating current, description thereof will be temporarily deferred pending reference to the means provided for locating and maintaining the pipe in proper relation to the electrode.

Said means, speaking generally, comprise a mandrel provided with rollers adapted to engage the inner wall of the pipe in advance of the welding point; other rollers adapted to support the wall of the pipe in the vicinity of the welding point, and finally, still other rollers adapted to support said wall in the plane of its seam after the welding has been effected. More specifically, the mandrel 20, best shown in Fig. 5, is supported at its forward end in any convenient way so that it will extend rearwardly within and substantially coaxially with the work, this support being preferably afforded by a thin fin or web 21 which extends into the bent-up skelp through the cleft between its longitudinal edges and is bolted to the adjacent end of the mandrel which is preferably slotted to receive the fin. The fin is disposed in vertical position and is supported outside the line of travel of the skelp, preferably and as shown, by bolting it by bolts 22 to a lug provided on the adjacent roll stand B which obviously affords a convenient point to which to secure the fin, but any other suitable support therefor may be employed instead. The fin thus serves as a guide to the formed-up skelp S, keeping it with the cleft uppermost and preventing its axial rotation in one direction or the other.

The welding electrode 25, hereinafter more fully described, is arranged to contact the pipe somewhat behind the rear edge of the fin, and in advance of this point of contact the mandrel is provided with a pair of small rollers 26—26 arranged one above the other and adapted to engage the wall of the skelp at diametrically opposed points in vertical alignment with the space between its longitudinal edges which, at this point in its travel, is necessarily relatively wide since the skelp has just passed over the fin; these rollers are mounted on horizontal stub axles 27 supported in the mandrel as best shown in Fig. 9. Behind the rollers 26, the mandrel is next provided with a pair of generally similar rollers 29 respectively adapted to contact the inner wall of the work at diametrically opposed points lying in the horizontal plane; these rollers are mounted on vertical stub axles 30 supported in the mandrel as best shown in Fig. 10 Considerably in rear of the welding point, the mandrel supports still another pair of rollers 31 mounted on horizontal stub axles 32 and adapted to contact the wall of the pipe at diametrically opposed points at the ends of its vertical diameter, these rollers being desirably in substantially vertical alignment with the seam pressing rolls 33, 34 which latter are disposed above and below the pipe and have their peripheries shaped in correspondence with its outer curvature as best shown in Fig. 11. The shafts supporting these seam rolls are respectively mounted in bearing blocks 35 vertically slidable in slots 36 formed in the upwardly extending arms of a generally U-shaped pedestal 37 which seats on transversely extending ways 38 formed on a block carried by the base of the machine, the position of the pedestal being governed through the medium of a hand wheel 39 actuating a cross screw, not shown, so that lateral adjustment of the rolls 33, 34 with respect to the line of travel of the pipe may be effected. The upper ends of the arms of the pedestal 37 may be tied together by a transversely extending cap 40 and any suitable means, not shown, provided for adjusting the height of the blocks 35 so as to vary the distance between the seam rolls and regulate the pressure which they exert on the pipe as it passes between them. For this purpose, means analogous to those ordinarily utilized to effect vertical adjustment of the rolls of a two-high rolling mill may conveniently be employed and, if desired, suitable means (not shown) may be provided for positively driving the seam rolls at a peripheral speed equal to the longitudinal speed of the pipe.

For supporting and exerting suitable inwardly directed pressure on the wall of the pipe in the vicinity of the welding point, a vertical supporting roller 45 and two horizontal rollers 46 are provided, the former being positioned beneath the pipe in substantial vertical alignment with the welding point, and the latter being positioned on opposite sides of the pipe and arranged for rotation on vertical axles 47, while the vertical roller is arranged for rotation on a horizontal axle 48. These several rollers are carried in a supporting structure or frame comprising a surbase 49 and uprights 50 rising therefrom on opposite sides of the work and respectively provided at their upper ends with jaw blocks 51, in which the axles 47 are journaled, which can be moved in or out by means of hand wheels 52 operating through threaded shafts 53, the specific details of construction being immaterial so long as provision is made for moving the rollers 46 laterally to accommodate different diameters of pipe and to regulate the pressure they exert upon the pipe as it passes between them. The axle 48 carrying the vertical roller 45 is journaled in a hollow supporting block 55 vertically slidable between the uprights 50; the under face of this block is desirably inclined, as shown in Fig. 5, and supported on an adjusting wedge 56 provided with a correspondingly inclined upper face and slidable at right angles to the axle 48 on a plate 57, the position of the wedge 56 being controlled by an adjusting screw 58 extended through a lug at the rear edge of the plate and maintained in adjusted position by lock nuts on both sides thereof; thus, by moving the screw in one direction or the other, the wedge 56 can be correspondingly slid along the plate so as to raise or lower the block 55 as required to effect proper contact of the roller 45 with the under side of the pipe. The plate 57 is in turn slidably mounted on the surbase 49 which is cut out as at 61 for the reception of a lug 57' depending from the plate and through which extends an adjusting screw 62 controlled by a hand wheel 63 in such manner that the plate, wedge 56, and block 55 can be moved longitudinally to correspondingly change the location of the roller 45 with respect to the horizontal rollers 46 since it is sometimes desirable to change the relative relation of these rollers in accordance with the particular operating conditions encountered.

The surbase 49 is in turn supported on longitudinally extending ways 64 provided on the base 1 of the machine and may be adjusted longitudinally thereon through the medium of an adjusting screw 65 actuated through suitable gearing 66 from a hand wheel 67. Consequently, by suitable manipulation of the parts to which reference has just been made, the height of the supporting roller 45 and its position of longitudinal adjustment with respect to the horizontal rollers 46 may be varied; the rollers 46 can be independently moved in and out from the work, and the supporting structure for these several rollers as a whole can be moved longitudinally as desired, thus materially facilitating the operation of the machine, its adjustment to various sizes of pipe, and the production of satisfactory welds.

It will thus be apparent that as the formed-up skelp S is progressively fed into the machine, the cleft between its longitudinal edges is opened by the fin 21 if it is not already sufficiently wide to accommodate it; that the pressure exerted inwardly by the rollers 46 as the skelp reaches the welding point tends to close the cleft before the current is introduced through the revolving electrode 25; that substantially below said point the pipe is suitably supported by the supporting roller 45 and that shortly after application of the current and welding of the cleft or seam by the well known principle of resistance welding, the seam is subjected to pressure between the rolls 33, 34, being preferably first cleaned and to some extent removed by an angularly disposed shearing wheel 68 located just in advance of the said rolls and secured to their supporting stand, so that the pipe ultimately emerges from the said rolls with its seam properly cleaned and consolidated, and that during the longitudinal progression of the work through the machine while these several operations are taking place, requisite and adequate support is given to the interior of the work at intervals by the rollers carried by the mandrel 20.

The several parts to which we have heretofore referred are utilized irrespective of whether the machine is arranged for use with direct or alternating current, and we shall now more particularly describe the means preferably employed for supporting and driving the revolving electrode and introducing the current thereto when direct current is being employed, as illustrated more particularly in Figs. 1, 2, 6, 7, and 8.

Mention has already been made of the shaft 10 which extends transversely above the path of the work and which serves as a medium for supporting the revolving electrode, its driving mechanism and associated parts. This shaft is provided with an integral flange 10' preferably located in substantially vertical alignment with the electrode 25 and thus with the axis of the pipe as it passes through the machine, and on both sides of the flange are disposed sleeves 70, 71 which surround the shaft and are respectively provided with downwardly and forwardly extending arms 72, 73 between which the electrode 25 is located. Each sleeve at its inner end, that is, the end adjacent the flange 10', is correspondingly outwardly flanged, and these flanges as well as the flange 10' are drilled for the passage of bolts 74 which serve to operatively unite the two sleeves to the flange 10' and thus to the shaft 10 so that both sleeves turn therewith. It will be noted that the electrode 25 and flange 10' are offset from the center line of the machine, being shown as located to the right thereof when viewed from the front. This offsetting is desirable when the machine is designed to be used with either direct or alternating current equipment since, when the latter is installed, the rotating transformer and associated parts, which all lie on the same side of the electrode, are of such size that they could not be accommodated between the pedestals 2, 3 if the electrode were placed on the center line without unduly increasing the width of the machine as a whole.

The sleeves 70 and 71 may be made long enough to extend from the flange 10' to the vicinity of the adjusting bushing nuts 8 on their respective sides or, with a view to minimizing weight, a flanged spacer sleeve 75 of less diameter than the sleeve 70 may be interposed between these parts and secured to the end of sleeve 70 by bolts 76; when the flange 10' is offset as just described, no corresponding spacer sleeve is ordinarily utilized adjacent the sleeve 71. Between the outer ends of the sleeves and the adjacent adjusting bushing nuts 8, annular ball thrust bearings 77 are disposed, and it will thus be apparent that the position of the shaft 10 and parts secured to it may be adjusted longitudinally in either direction by screwing the adjusting bushing nuts 8 in opposite directions in their supporting bushings 7 to enable the revolving electrode to be brought into proper alignment with the seam of the pipe. To prevent interference with this adjustment of shaft 10, the crank 12 forms a sliding fit on the end of the shaft.

The downwardly and forwardly extending arms 72, 73 support between them the revolving electrode 25 which is mounted on a shaft 80 journaled in antifriction bearings 81 disposed near the free ends of the arms. This shaft is extended beyond the arm 72 to support a gear 82 and finally journaled at its outer end in an antifriction bearing 83 adjacent the end of another arm 84 extending downwardly and forwardly from the sleeve 70 in substantially parallel relation with the arm 72. This gear 82, which is secured to the shaft 80, forms the end member of a gear train, generally designated as 85, interposed between it and a pinion 86 on the shaft of a motor 87 supported on a bracket formed adjacent the inner end of the arm 84 and which serves through the said pinion, train and gear 82 to drive the shaft 80 at a speed such that the peripheral speed of the revolving electrode approximates that of the longitudinal speed of the pipe as it passes through the machine. In order to insure substantial synchronization of these speeds and thus prevent slippage between the pipe and the electrode which would rapidly wear out the latter, as it is usually made of copper and would thus be easily abraded by the relatively hard and rough surface of the pipe, the motor is preferably provided with an overrunning clutch or other means (not shown) operative to compensate for any difference in speed between the electrode and the pipe and thereby insure a rolling rather than a sliding contact between them.

For conveying the current to and from the machine, suitable conductors are provided which in their preferred embodiment comprise two sets of copper tubes 90, 91, the former serving to carry the current to the machine and the latter to conduct it therefrom. The ends of the tubes 90, of which any desired number may be employed and through which water is desirably circulated, are flattened and inserted in a lug 92 extending rearwardly from the sleeve 70 and formed with a plurality of slots or jaws for receiving them, as best shown in Fig. 2. In a similar manner, the ends of the tubes 91 are inserted in a generally similar lug 93 extending rearwardly from the sleeve 71, and both sleeves are insulated from the shaft 10 and from each other in any suitable way, preferably and as best shown in Fig. 6, by arranging a layer of insulation generally designated as I between the sleeve 70 and the shaft 10 and between the sleeve 71 and the shaft, as well as between the outer ends of the sleeves and the adjacent thrust bearings and between their inner ends and the flange 10', the bolts 74 being also insulated from the adjacent metal parts. Moreover, in order to cool the sleeves and arms 72, 73 which serve as current conducting elements, each of the sleeves and arms is preferably made hollow as best shown in Fig. 6, and a connection 97, desirably somewhat flexible, provided between the free ends of the arms so that water conducted to the cavity in the sleeve 70 by a connection 98 can pass downwardly through the hollow arm 72, thence through the connection 97 to the other arm 73, upwardly in the latter into the sleeve 71, and finally outwardly from the sleeve through another connection 99, or in a contrary direction if the water is initially introduced through the latter.

The arm 72 is thus effective to convey the current downwardly to a brush holder 100 (see Figs. 7 and 8) which is secured to the free end of the arm by bolts 101. This holder may comprise a generally semicircular plate having inwardly overhanging lugs 102 through which pass adjusting screws 103 carrying at their inner ends segments 104 provided with brushes 105 which bear on the adjacent hub of the revolving electrode. The segments are held to the face of the plate by bolts 107 extending through slots in the latter, so that by loosening the bolts and turning the adjusting screws in or out, the brushes may be caused to properly engage the electrode hub. A similar brush holder 110, supporting brushes 111 through the medium of segments 112 controlled by adjusting screws 113 extended through lugs 114, is secured to the lower end of the arm 73, which serves to conduct the current from this brush holder to the sleeve 71, and thence to the conductors leading therefrom.

The electrode 25 is made of two similar elements disposed in opposed relation on opposite sides of a flange 80' on the shaft 80. Each of these elements comprises a hub 115, of which mention has already been made, at one end of which is an outwardly directed peripheral flange 116, the edge of which is chamfered as at 116' on a radius substantially conforming to that of the pipe so as to form a good contact therewith, and the parts are arranged so that the flanges 116 are slightly separated, as best shown in Fig. 7, to respectively engage the pipe on opposite sides of its seam. Each of the hubs 115 carries an inwardly directed flange 117 which overlaps flange 80' through which, as well as the flanges on the hubs, are extended bolts 118 which serve to hold the hub elements in properly assembled relation on shaft 80, both elements being suitably insulated from the shaft, from bolts 118, and from each other by insulation generally designated as I'.

Each of the hubs 115 of the electrode is made hollow, of considerably greater diameter than the shaft 80, and provided with an inwardly turned annular flange 115' at its outer end, the inner edges of these flanges clearing the shaft by a considerable margin. Through each of the openings thus formed, a small pipe 119 is extended and curved downwardly over the flange as best shown in Fig. 7. Through these pipes water is constantly pumped while the machine is in operation and thus forms a pool within each hub of a depth equal to the height of the flange 115', the excess water flowing over the latter and into a trough or gutter 120 suitably arranged to carry it away to some convenient point. In this manner, the electrode as a whole is cooled while the machine is in operation.

It will now be apparent that with the parts constructed and arranged substantially as described, all of the current conveying mechanism, including the revolving electrode, is supported from the shaft 10, and that the position of the electrode 25 can be adjusted laterally of the machine so as to properly align it with the pipe and also adjusted vertically by suitably rotating the shaft 10 through the medium of the motor 15 or other means provided, so that the periphery of the electrode can be brought into and maintained in proper engagement with the surface of the pipe as it passes beneath it. As the parts supported from the arms 72, 73, 84 are relatively heavy, some suitable form of counterweighting means is desirably provided for relieving the strains which would otherwise be imposed thereon, as well as for facilitating accurate adjustment of the electrode with respect to the work such, for example and as shown, as an arm 124 extending rearwardly from the sleeve 71 and carrying an adjustable counterweight 125.

A dressing wheel 126 of suitable character driven from a small motor 127 mounted on a bracket 128 on the arm 73 may be arranged to bear constantly against the faces 116' of the electrode 25 to insure their being kept in condition to effect proper contact with the work.

It will be noted that the current carrying elements, including the sleeves, arms, and electrode itself, are adequately cooled during the operation of the machine and are effectively insulated in such manner that the current is caused to pass from conductors 90 into one side of the electrode, thence through the work, into the other side of the electrode, and finally to the conductors 91 leading from the machine through parts of adequate size for satisfactory conductivity and minimization of resistance losses.

By detaching the conductors 90, 91, removing the yoke 5, and lifting out the shaft 10 with its attached parts, including the electrode, electrode driving means, and supporting sleeve, all of the mechanism utilized for conveying current to and from the work may be readily disassembled for repair or replacement, while a new electrode can be very readily substituted whenever required by simply taking off the bearing caps and brush holders which hold the shaft 80 in operative position. As it is frequently necessary to change electrodes in the operation of machines of this character, this is a distinct advantage, as it eliminates much of the labor and time necessary to effect a similar substitution in welding machines as heretofore constructed.

Moreover, if it be desired at any time to arrange the machine for the use of alternating current, assuming it has been originally set-up for the use of direct current, it is only necessary to lift out the shaft 10 with its attached parts as just described and then remove the sleeves 70, 71 and mechanism supported therefrom, thus leaving the shaft free. Thereupon, other generally similar sleeves 170, 171 are mounted upon it, these sleeves being respectively provided with arms 184, 172, 173 (see Fig. 3), generally corresponding to arms 84, 72, 73. The arms 184, 172 are adapted to support a gear train 185 driven from a pinion 186 on the shaft of a motor 187, mounted on a bracket on the sleeve 170, serving to drive a gear 182 on a shaft 180 journaled adjacent the free ends of the several arms and in turn supporting a rotary transformer T between the arms 172, 173 to the face of which is secured a circular rotatable electrode 25' composed of two spaced elements and adapted to span the seam in the pipe in a manner generally similar to the electrode 25, one element serving to convey to the pipe the current induced in the secondary coil of the transformer and the other to complete the return circuit thereto. The alternating primary current is brought to the transformer by a suitable conductor 190 communicating with a collector ring or like device diagrammatically indicated at C mounted on shaft 180, and is returned to the line by a conductor 191 communicating with another collector ring or like device diagrammatically indicated at C', also mounted on the shaft and connected with the negative side of the primary coil of the transformer. As the particular construction of the rotary transformer T and collectors or commutators C—C' or other means utilized for carrying the current to it and returning it to the line forms no part of the invention, and may be of any suitable form and construction, further reference thereto herein or more than diagrammatical illustration thereof in the drawings would be superfluous.

It is believed the operation of the machine, whether arranged for the use of direct or of alternating current, will be readily understood from the foregoing description without extended explanation. It may be noted, however, that after the various pipe supporting and guiding rolls are properly adjusted to carry the work through the machine in a predetermined path with its cleft or seam uppermost, the revolving electrode can be brought into engagement with the work with the requisite nicety by suitable manipulation of the motor 15 or other means for rotating the shaft 10 after it has been adjusted laterally into proper vertical alignment with the work, and that once the machine is suitably adjusted for a particular size and kind of pipe, its operation is thereafter substantially automatic and requires but little attention. Under ordinary conditions, the pipe may be moved through the machine at a rate of from fifty to sixty feet per minute for an average wall thickness of one-quarter inch and satisfactorily welded by means of either a direct or an alternating current of from 100,000 to 150,000 amperes and about 5¼ volts at the pipe. The generation of direct current of such character is now entirely feasible; thus, the known advantages flowing from the use of direct current for pipe welding and allied operations can be readily attained by the use of the present invention which particularly lends itself to the employment of such current.

While we have herein illustrated and described a preferred form of our invention with considerable particularity and have shown it arranged for use with direct and also with alternating current, we do not thereby desire or intend to confine or restrict ourselves to specific details of design, construction and arrangement of the various parts as they are capable of modification in numerous particulars if desired without departing from the spirit and scope of the invention as defined in the appended claims.

Having thus described our invention, we claim and desire to protect by Letters Patent of the United States:

1. A pipe welding machine comprising means for supporting and guiding the pipe as it is progressively fed therethrough, a supporting frame, a shaft journaled in the frame extending transversely above the path of the pipe, means for effecting limited rotative adjustment of the shaft, a pair of spaced sleeves fixedly secured on the shaft, arms extending from said sleeves in substantially parallel relation, a rotatable electrode supported between adjacent arms respectively carried by said sleeves, and driving means for the electrode supported from arms extending from one of said sleeves, rotation of the shaft being operative to vary the height of the electrode with respect to the path of the pipe.

2. A resistance pipe welding machine comprising a frame, means for supporting and guiding the pipe as it is progressively fed through the machine in a path within the limits of said frame, a shaft journaled in the frame above the path of the pipe extending transversely thereof, means for effecting limited rotative adjustment of the shaft in either direction and operative to thereafter hold it in adjusted position, a pair of spaced sleeves mounted on the shaft, means for securing said sleeves in fixed operative relation thereto, a rotatable electrode, supporting means therefor comprising a pair of arms respectively extending from said sleeves and a shaft carrying the electrode and journaled adjacent the free ends of said arms, and driving means for said electrode shaft solely supported from one of said sleeves, and means including said arms for conveying current to and from the electrode.

3. A resistance pipe welding machine comprising a supporting frame, means for guiding and supporting the pipe within the limits of the frame as it is progressively fed through the machine, a shaft journaled in the frame extending transversely above the path of the pipe, means for effecting limited rotational movement of the shaft, means for adjusting the shaft longitudinally in the frame, a welding electrode comprising separated elements respectively adapted to contact the pipe on opposite sides of its seam, spaced sleeves mounted on the shaft, means for holding said sleeves in operatively rigid position thereon, an arm extending from each of said sleeves on opposite sides of the electrode, an electrode supporting shaft journaled adjacent the free ends of said arms, driving means for said electrode shaft supported solely from one of said sleeves, means for insulating said sleeves from said shaft and from each other, means for insulating the elements of the electrode from its supporting shaft and from each other, means including one of said arms for conveying current to one side of the electrode and other means for conveying it from the other side of the electrode after it has traversed the pipe to form the weld therein.

4. A resistance pipe welding machine comprising a frame, means for supporting and guiding the pipe as it is fed progressively through the machine, a shaft extending transversely in the frame above the path of the pipe, a pair of sleeves secured on the shaft in spaced relation with each other, each sleeve having a generally radially extending arm, a rotatable electrode disposed between and supported from the free ends of said arms adapted to contact the pipe as it passes therebeneath, and means for driving the electrode supported solely from one of said sleeves.

5. A resistance pipe welding machine comprising a frame, means for supporting and guiding the pipe as it is fed progressively through the machine, a shaft extending transversely in the frame above the path of the pipe, a pair of sleeves secured on the shaft in spaced relation with each other, means insulating the sleeves from the shaft and from each other, each sleeve having a generally radially extending arm, a rotatable electrode disposed between and supported from the free ends of said arms adapted to contact the pipe as it passes therebeneath, means for driving the electrode supported solely from one of said sleeves, said electrode having separated parts respectively adapted to contact the pipe on opposite sides of its seam as it passes beneath it, means insulating said parts from each other, means including one of said sleeves and its arm for conducting current to one of said parts, and means including the other sleeve and its arm for conducting current from the other of said parts after the current has traversed the pipe to produce the weld therein.

6. A resistance pipe welding machine comprising means for guiding and supporting the pipe as it is progressively fed to the machine, a horizontal shaft supported above the path of the pipe, a pair of sleeves operatively secured on the shaft in spaced relation, means insulating the sleeves from each other and from the shaft, an arm extending from each sleeve in a generally radial direction, each of said sleeves and said arms being hollow, means for effecting a circulation of water through one of said sleeves and its arm and thence through the other arm and its sleeve, a rotatable electrode adapted to contact the pipe mounted between the free ends of the arms and driving means for the electrode including a gear train and driving means therefor supported solely from one of said sleeves.

7. In a resistance pipe welding machine, means for guiding and supporting the pipe as it is progressively fed to the machine, a horizontally extending shaft disposed above the path of the pipe, means for supporting the shaft, a pair of spaced sleeves operatively fixed to the shaft, each sleeve having an arm extending generally radially therefrom, means for insulating the sleeves from the shaft and from each other, an electrode shaft journaled adjacent the free ends of said arms, a two-part rotatable electrode mounted on said shaft between the arms, means for insulating the two parts of the electrode from each other and from the electrode shaft, driving means for the electrode shaft including a gear train and a prime mover supported solely from one of said sleeves, means including the adjacent arm for conducting current from one of said sleeves to one of the parts of the electrode, and means including the other of said arms for conducting current from the other part of the electrode to the other sleeve.

8. In a resistance pipe welding machine, means for guiding and supporting the pipe as it is progressively fed to the machine, a shaft extending transversely above the path of the pipe, means for supporting said shaft, a pair of spaced sleeves fixedly mounted on said shaft, each sleeve having an integral arm extending therefrom, means for insulating said sleeves from the shaft and from each other, an electrode shaft extending between and journaled adjacent the free ends of said arms, a rotatable electrode comprising spaced elements mounted on said shaft, means for insulating said elements from the shaft and from each other, means for driving said shaft, a brush holder carried by each arm, brushes supported thereby engaging adjacent portions of the electrode, means including one of said sleeves and its arm for conducting current to the adjacent brush holder and thence to the adjacent side of the electrode, and means including the other sleeve and its arm for conducting current from the opposite side of the electrode and adjacent brush holder after the current has passed from one side of the electrode to the other side thereof through the wall of the pipe being welded.

9. In a resistance pipe welding machine, means for guiding and supporting the pipe as it is progressively fed to the machine, a shaft extending transversely above the path of the pipe, means for supporting said shaft, a pair of spaced sleeves fixedly mounted on said shaft, each sleeve having an integral arm extending in a generally radial direction therefrom, means for insulating said sleeves from the shaft and from each other, an electrode shaft extending between and journaled adjacent the free ends of said arms, a rotatable electrode comprising spaced elements mounted on said shaft, each element having a flange adapted to contact the pipe and a hub, means for insulating said elements from the shaft and from each other, means supported solely from one of said sleeves for driving said shaft, a brush holder carried by each arm, brushes supported thereby engaging the respectively adjacent electrode hubs, means including one of said sleeves and its arm for conducting current to the adjacent brush holder and thence to the adjacent electrode hub, and means including the other sleeve and its arm for conducting current from the other electrode hub and adjacent brush holder after the current has passed from one side of the electrode to the other side thereof through the wall of the pipe being welded.

10. A resistance pipe welding machine comprising a frame, means for supporting and guiding the pipe as it is fed progressively through the machine, a shaft extending transversely in the frame above the path of the pipe, a pair of sleeves secured on the shaft each having an outwardly extending arm, a rotatable electrode disposed between and supported from the free ends of said arms adapted to contact the pipe as it moves through the machine.

11. In a resistance pipe welding machine, a rotatable electrode comprising similar oppositely disposed spaced elements each having a peripheral flange adapted to contact the pipe to be welded and a hollow hub extending outwardly therefrom and provided with an inwardly directed flange adjacent its outer end, a shaft extending transversely through the electrode, means for securing the elements of the electrode in fixed relation to the shaft, means for insulating said elements from the shaft and from each other, driving means for the shaft, means for introducing a cooling fluid into each of said hollow hubs to cool the electrode while it is revolving, and means for conveying said fluid therefrom.

12. In a resistance pipe welding machine, a shaft extending above the path of the work as it is fed through the machine, a pair of hollow axially spaced sleeves disposed thereon each having a hollow arm extending outwardly from the body of the sleeve, the cavity in the arm communicating with that in the sleeve, an electrode mounted for rotation between the free ends of the arms, a fluid connection between said ends, and means for supplying a cooling fluid to one of said sleeves and for conducting it from the other after it has passed from one arm to the other through said connection.

13. In a resistance pipe welding machine, a shaft extending above the path of the work as it is fed through the machine, a pair of hollow axially spaced current carrying sleeves disposed thereon each having a hollow current carrying arm extending outwardly from the body of the sleeve, the cavity in the arm communicating with that in the sleeve, an electrode mounted for rotation between the free ends of the arms, and means for effecting a circulation of cooling fluid within each of said sleeves and said arms.

14. A resistance pipe welding machine comprising a supporting frame, means for guiding and supporting the work to be welded as it is progressively fed therethrough, a horizontal shaft extending transversely above the path of the work and journaled in the frame for axial rotation, means for rotating the shaft and maintaining it in any position of rotational adjustment within a predetermined arc, a pair of longitudinally spaced sleeves mounted on the shaft in fixed operative relation therewith, each shaft having a generally radially projecting arm, a rotatable electrode adapted to engage the work to be welded mounted between said arms, means for driving said electrode, and counterweighting means adapted to counterbalance the weight of the electrode, arms, and associated parts.

15. In a pipe welding machine, means for guiding and supporting the work to be welded as it is progressively fed through the machine including a supporting roller disposed beneath the work, a mandrel extending within the work and carrying rollers adapted to engage the inner wall thereof prior to the application of the welding current, means extending through the unwelded seam in the work for supporting one end of the mandrel, a revolving electrode arranged to contact the work on opposite sides of its seam to conduct welding current to and from the work, rollers disposed on opposite sides of the work in advance of the point of contact of the electrode therewith operative to close said seam preparatory to welding, and rolls disposed above and below the work behind said point of contact operative to press on the work at diametrically opposed points in the plane of the seam after the latter has been welded.

16. In a pipe welding machine, means for guiding and supporting the work to be welded as it is progressively fed through the machine including a supporting roller disposed beneath the work, a mandrel extending within the work and carrying rollers adapted to engage the inner wall thereof prior to the application of the welding current, means extending through the unwelded seam in the work for supporting one end of the mandrel, a revolving electrode arranged to contact the work on opposite sides of its seam to conduct welding current to and from the work, rollers disposed on opposite sides of the work in advance of the point of contact of the electrode therewith operative to close said seam preparatory to welding, and rolls disposed above and below the work behind said point of contact operative to press on the work at diametrically opposed points in the plane of the seam after the latter has been welded, said mandrel carrying adjacent its free end rollers aligned with said rolls adapted to resist the inward pressure thereof upon the work.

17. In a pipe welding machine, means for guiding and supporting the work as it is progressively fed therethrough including a mandrel adapted to extend within the work, means projecting through the open seam in the work for supporting one end of the mandrel, a pair of horizontal rollers carried by the mandrel for engagement with the inner wall of the work, a pair of horizontal rollers substantially aligned therewith operative to engage the outer wall of the work to substantially close the seam thereof preparatory to welding, a rotatable electrode adapted to engage the work on opposite sides of said seam and to convey welding current to and from the work to thereby form the weld therein, a supporting roll disposed substantially beneath the point of contact of the welding roll with the work and adapted to support the latter, means for adjusting the vertical height of said supporting roll, means for adjusting the outer horizontally positioned rolls laterally, and means for adjusting said horizontal rolls and supporting roll as a unit longitudinally of the work.

18. In a pipe welding machine, means for guiding and supporting the work as it is progressively fed therethrough including a mandrel adapted to extend within the work, means projecting through the open seam in the work for supporting one end of the mandrel, a pair of horizontal rollers carried by the mandrel for engagement with the inner wall of the work, a pair of horizontal rollers substantially aligned therewith operative to engage the outer wall of the work to substantially close the seam thereof preparatory to welding, a rotatable electrode adapted to engage the work on opposite sides of said seam and to convey welding current to and from the work to thereby form the weld therein, a supporting roll disposed substantially beneath the point of contact of the welding roll with the work and adapted to support the latter, means for adjusting the vertical height of said supporting roll, means for adjusting the outer horizontally positioned rolls laterally, means for longitudinally adjusting the supporting roll relatively to said horizontal rolls, and means for adjusting said horizontal rolls and supporting roll as a unit longitudinally of the work.

19. In a resistance pipe welding machine, a rotatable electrode comprising spaced elements disposed in opposed relation and a shaft extending through both elements, each element having a pipe engaging surface and comprising a radially directed flange adapted to be secured to the shaft and a hollow hub extending axially from the pipe engaging portion of the element and having its outer end radially spaced from the shaft.

20. In a resistance pipe welding machine, a rotatable electrode comprising spaced elements disposed in opposed relation and a shaft extending axially through both elements to afford support thereto, each element having a peripheral pipe-engaging surface and comprising a hollow hub extending axially from its pipe-engaging portion with a radially inwardly directed flange at each of its ends, the outermost of said flanges being spaced from the shaft, and means operative to secure the other flange to and insulate it from the shaft.

21. In a resistance pipe welding machine, a rotatable electrode comprising spaced elements disposed in opposed relation, each element having a pipe-engaging surface, a shaft supporting the electrode and carrying a radially extending flange, a hollow hub extending axially outwardly from each of said elements, radially spaced from said shaft and comprising axially separated radially inwardly extending flanges respectively adjacent its extremities and means securing the innermost of said flanges to the flange carried by the shaft.

22. In a resistance pipe welding machine, a rotatable electrode, a supporting shaft therefor, means on each side of the electrode forming journals for the ends of the shaft and providing chambers for the passage of a coolant, means supporting said journal forming means and means for effecting a circulation of a coolant successively through said chambers.

23. In a resistance pipe welding machine, a pair of arms, anti-friction bearings carried thereby, an electrode supporting shaft rotatably disposed in said bearings and extending therebetween, a radial flange carried by said shaft, complementary opposed electrode elements surrounding said shaft and secured to said flange, means insulating said elements from said flange and from each other, a cylindrical hub integral with each of said elements respectively extending axially outwardly therefrom in opposite directions, a brush carried by each of said arms and respectively operative to engage said hubs, an inwardly turned annular flange integral with each of said hubs adjacent its outer extremity and means for continuously supplying a cooling fluid to the interiors of the hubs during rotation of the electrode.

24. In a resistance pipe welding machine, a rotatable electrode comprising opposed pipe-engaging elements, a hollow cylindrical hub extending axially outwardly from each element and having a radially inwardly directed annular flange adjacent its outermost end, means externally contacting each hub for supplying welding current to the electrode, and means projecting into each hub for continuously supplying coolant thereto during rotation of the electrode.

25. A resistance pipe welding machine comprising a supporting frame, means for guiding and supporting the pipe within the limits of the frame as it is progressively fed through the machine, a shaft journaled in the frame extending transversely above the path of the pipe, a welding electrode comprising separated elements respectively adapted to contact the pipe on opposite sides of its seam, spaced sleeves rigidly mounted on the shaft, an arm extending from each of said sleeves on opposite sides of the electrode, an electrode supporting shaft journaled adjacent the free ends of said arms, means for insulating said sleeves from said first-mentioned shaft and from each other, means for insulating the elements of the electrode from its supporting shaft and from each other, a current source interconnected with said arms and means respectively interconnecting said arms with said elements to thereby supply welding current to said elements for completion of a circuit through the pipe to form the weld therein.

GEORGE E. MIRFIELD.
CYRIL FIRTH.